(12) United States Patent
Zoubi et al.

(10) Patent No.: US 12,527,960 B2
(45) Date of Patent: Jan. 20, 2026

(54) APPARATUS FOR TESTING A CARDIAC CATHETER UTILIZING LIVE CARDIAC CELLS

(71) Applicant: Biosense Webster (Israel) Ltd., Yokneam (IL)

(72) Inventors: Alaa Zoubi, Sakhnin (IL); Nakdimon Nissim Levy, Pardes Hana (IL); Tal Haim Bar-On, Kiryat Tivon (IL); Gal Hayam, Tivon (IL); Wagdi Hani Hagla, Julis village (IL); Shiran Eliyahu, Yokneam Illit (IL); Aharon Turgeman, Zichron Ya'acov (IL); Michael Maydel, Haifa (IL); Refael Itah, Tel Aviv (IL); Lior Botzer, Timrat (IL); Hen Kdoshai Scliar, Hadera (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 833 days.

(21) Appl. No.: 17/370,757

(22) Filed: Jul. 8, 2021

(65) Prior Publication Data

US 2022/0016419 A1    Jan. 20, 2022

Related U.S. Application Data

(60) Provisional application No. 63/052,808, filed on Jul. 16, 2020.

(51) Int. Cl.
*A61N 1/00*    (2006.01)
*A61N 1/05*    (2006.01)
(Continued)

(52) U.S. Cl.
CPC .............. *A61N 1/362* (2013.01); *A61N 1/056* (2013.01); *A61N 1/3787* (2013.01); *C12M 1/42* (2013.01); *C12N 5/0657* (2013.01); *C12N 13/00* (2013.01)

(58) Field of Classification Search
None
See application file for complete search history.

(56) References Cited

U.S. PATENT DOCUMENTS

| | | |
|---|---|---|
| 5,391,199 A | 2/1995 | Ben-Haim |
| 5,443,489 A | 8/1995 | Ben-Haim |
| (Continued) | | |

FOREIGN PATENT DOCUMENTS

| | | | |
|---|---|---|---|
| WO | 2018/200782 A1 | 11/2018 | |
| WO | WO-2020081982 A1 | * 4/2020 | ......... A61L 27/3834 |

OTHER PUBLICATIONS

International Search Report, corrected version, and Written Opinion dated Dec. 2, 2021 for Application No. PCT/IB2021/056384, 15 pgs.

*Primary Examiner* — Niketa Patel
*Assistant Examiner* — Anant A Gupta
(74) *Attorney, Agent, or Firm* — Frost Brown Todd LLP

(57) ABSTRACT

A medical tool testing apparatus comprising a vessel. The vessel comprises a scaffold formed from biomaterial, live cardiac tissue, generated from cardiac cells, proliferating on the scaffold, the live cardiac tissue configured to generate electrical activity. The vessel also comprises a medical tool, in contact with live cardiac tissue, used for a medical procedure within patient anatomy. Operational features of the medical tool are determined by a visually perceptible condition of the live cardiac tissue.

20 Claims, 5 Drawing Sheets

(51) Int. Cl.
*A61N 1/362* (2006.01)
*A61N 1/378* (2006.01)
*C12M 1/42* (2006.01)
*C12N 5/077* (2010.01)
*C12N 13/00* (2006.01)

(56) References Cited

U.S. PATENT DOCUMENTS

| | | |
|---|---|---|
| 5,558,091 A | 9/1996 | Acker et al. |
| 5,931,863 A * | 8/1999 | Griffin, III .......... A61N 1/0563 607/122 |
| 5,944,022 A | 8/1999 | Nardella et al. |
| 5,983,126 A | 11/1999 | Wittkampf |
| 6,172,499 B1 | 1/2001 | Ashe |
| 6,177,792 B1 | 1/2001 | Govari et al. |
| 6,266,551 B1 | 7/2001 | Osadchy et al. |
| 6,456,828 B1 | 9/2002 | Ozluturk |
| 6,690,963 B2 | 2/2004 | Ben-Haim et al. |
| 6,788,967 B2 | 9/2004 | Ben-Haim et al. |
| 6,932,804 B2 | 8/2005 | Lee |
| 8,357,152 B2 | 1/2013 | Govari et al. |
| 8,535,308 B2 | 9/2013 | Govari et al. |
| 2016/0270729 A1* | 9/2016 | Dvir ..................... A61B 5/4848 |
| 2017/0304500 A1 | 10/2017 | Montgomery et al. |
| 2021/0371790 A1* | 12/2021 | Macqueen ......... G01N 33/5088 |

* cited by examiner

APPARATUS FOR TESTING A CARDIAC CATHETER UTILIZING LIVE CARDIAC CELLS

CROSS REFERENCE TO RELATED APPLICATION

This application claims the benefit of U.S. provisional application No. 63/052,808 filed on Jul. 16, 2020, which is incorporated by reference as if fully set forth.

FIELD OF INVENTION

The present application relates the field of medical diagnosis and treatment using medical tools and, in particular, to the testing of medical probes, such as catheters, utilized during electrophysiology procedures.

BACKGROUND

Medical personnel, such as ear, nose and throat (ENT) physicians and cardiologists, use medical tools, such as catheters, for performing medical procedures within patient anatomy. For example, catheters can be used to detect and map electrical activity in patient anatomy (e.g., electrocardiogram (ECG) signals of a heart) for generating maps (e.g., high resolution maps) of the anatomy (e.g., map of the heart). The ECG signals are acquired (i.e., recorded for a period of time) via a plurality of catheter electrodes placed at different areas of the heart. The acquired signals are monitored and used, along with location information indicating locations of the medical tool and the electrodes in a three dimensional (3D) space, to create the dynamic maps of the heart. Based on a visual assessment of the maps, a region of interest of the heart may be determined, which may include an area of the heart causing an irregular heart rhythm to be targeted for ablation.

Catheters may be also used to ablate sites (e.g., portions of dysfunctional tissue, such as tissue of a heart, lung, ear, nose, throat or other organs) of aberrant electrical activity. For example, a radio-frequency (RF) catheter ablation procedure typically includes insertion of a catheter (e.g., a multi-electrode cardiac ablation catheter) through an incision in the skin and guiding the catheter to an organ (e.g., heart) where the catheter is used to create ablation lesions on the organ tissue.

SUMMARY

A medical tool testing apparatus comprising a vessel. The vessel comprises a scaffold formed from biomaterial, live cardiac tissue, generated from cardiac cells, proliferating on the scaffold, the live cardiac tissue configured to generate electrical activity. The vessel also comprises a medical tool, in contact with live cardiac tissue, used for a medical procedure within patient anatomy. Operational features of the medical tool are determined by a visually perceptible condition of the live cardiac tissue.

A medical tool testing system comprising a vessel comprising a scaffold formed from biomaterial, live cardiac tissue, generated from cardiac cells, proliferating on the scaffold, the live cardiac tissue configured to generate electrical activity and a medical tool, in contact with live cardiac tissue, used for a medical procedure within patient anatomy. The system also comprises an electrical pulse generator configured to provide electrical pulses, at least one pacing electrode, electrically connected to the electric pulse generator and in contact with the live cardiac tissue, configured to deliver the electrical pulses to the live cardiac tissue as electrical pacing pulses and a processor configured to provide attributes of a condition of the cardiac tissue for display.

A method of testing a cardiac catheter under conditions replicating a beating heart, the method comprising delivering, by a plurality of pacing electrodes in contact with live cardiac tissue in a vessel, electrical pacing pulses to the live cardiac tissue, generating, by the live cardiac tissue, a condition of the cardiac tissue in response to the electrical pacing pulses, recording, by recording electrodes disposed on a cardiac catheter in contact with the live cardiac tissue, attributes of the condition of the cardiac tissue and providing the attributes of the condition of the cardiac tissue as attribute information for display.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1:
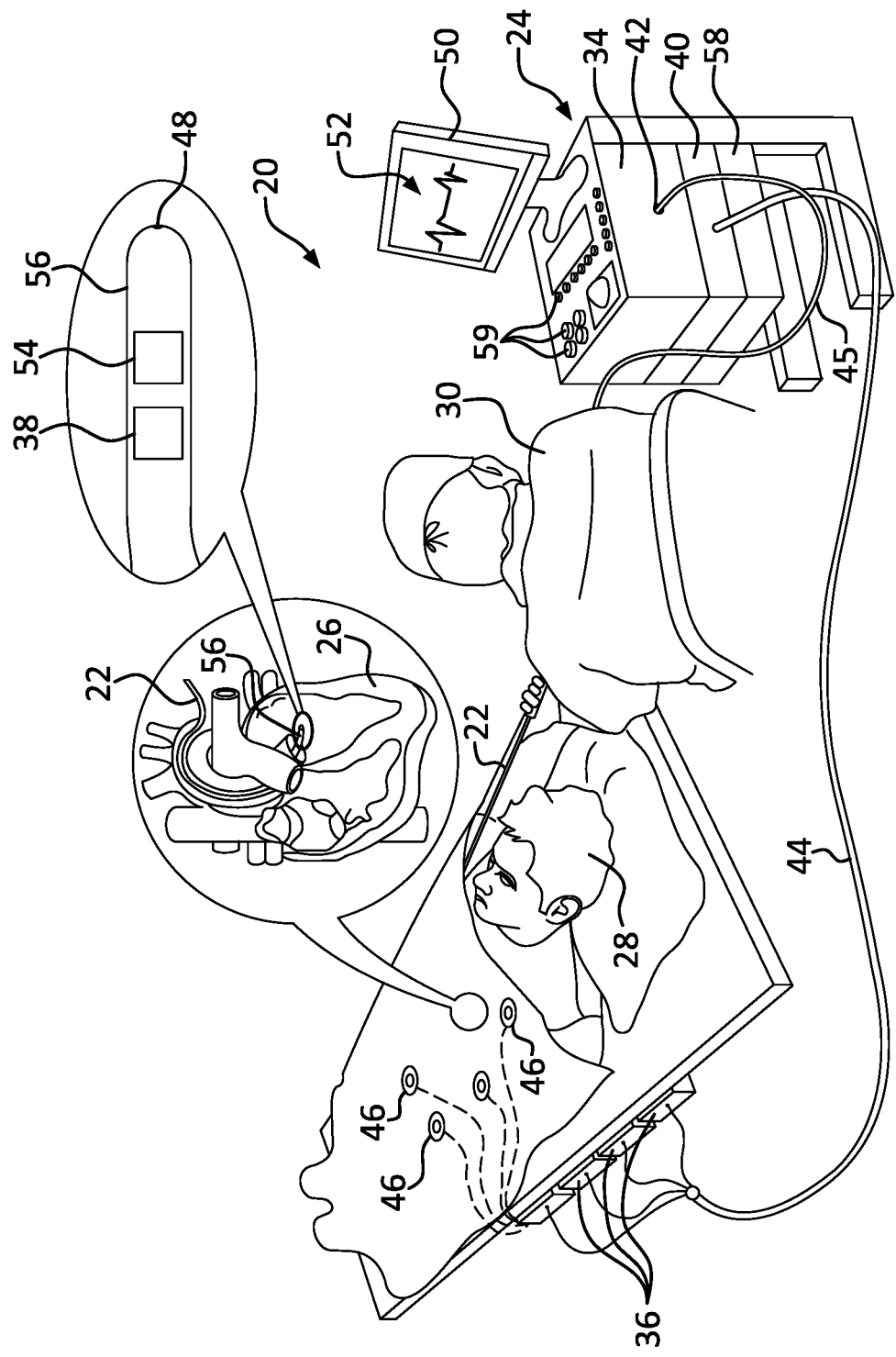
FIG. 1 is an illustration of an example medical system in which a medical tool, which is tested according to embodiments disclosed herein, is navigated in a three dimensional (3-D) space.

Technology relating to medical tools, such as cardiac catheters, used to perform medical procedures within patient anatomy, is constantly evolving. Improvements to the use of such catheters and their existing features are rapidly evolving, and new uses and features are quickly being introduced. Examples of such improvements may include cardiac catheters utilizing improved electrical grounds, improved multiple electrodes for monitoring temperature within the heart, cardiac catheters utilizing improved structure, shape and electrode design to obtain higher quality information or additional information from the heart during electro-anatomical mapping, and improved methods for producing data from the electrodes.

Medical tools, such as cardiac catheters, must be tested before they are approved for use within human anatomy. Some conventional techniques for testing features of these catheters include an electric PCB (printed circuit board) test jig for use in "hacking" the catheter. In particular, a combination of signals are generated and provided to the catheter for analysis with the PCB test jig. The PCB test jig is useful for testing these medical tools because the same test can be repeated multiple times (i.e., reproduced). Reproducing the hardware and wiring is expensive and rigorous, however, and the electric PCB test jig cannot accurately reflect the integration and response of cells in human heart tissue.

Other conventional techniques for testing features of catheters include the use of preclinical animal studies. Verification of certain catheter features in proof of design testing requires the use of live tissue which responds to pacing and produces electrical signals. For example, the heart tissue of pigs may be used to analyze the activation of the catheter in the animal tissue. These animal studies simulate the manner in which human heart cells behave better than the use of a PCB test jig. Animal testing is not reproducible, however, because the characteristics and reaction of the tissue of each animal may be different. Animal testing can also be complicated, time consuming and involve ethical concerns. In addition, environmental factors that impact the character of the animal tissue can diminish the reliability of such animal studies, requiring multiple tests and assumptions to confirm the test results. Further, conditions or irregularities in human anatomy (e.g., heart) may not be present in animal anatomy.

The present application provides an improved approach for testing various features of medical tools, such as catheters. Features of the present disclosure include apparatuses and methods for testing a cardiac catheter under conditions replicating a beating heart.

Features of the present disclosure include a testing apparatus (i.e., a Bio Jig) which utilizes live cardiac cells to provide reliable and consistent testing of newly implemented features of catheters, such as determining whether the catheter is producing accurate and consistent measurements, such as estimation of signals used for pacing and/or mapping procedures. The testing apparatus is easily producible and provides repeatable testing of catheter features.

The testing apparatus includes testing which more closely mimics particular characteristics of human tissue (e.g., heart tissue), such as healthy tissue and scarred tissue, than testing on animal tissue and more closely replicates the environment encountered a medical professional (e.g., a physician) during an electrophysiology procedure on human anatomy.

The testing apparatus utilizes live cardiac stem cells which beat in a controlled, repeatable environment (e.g., a liquid-tight container which ensures that the cardiac cells will survive and thrive. The cardiac tissue can be directly harvested from a target organ, or developed (e.g., grown) from precursor or stem cells. The human cardiac cells are combined with highly porous scaffold biomaterials, which guide their growth. The scaffold biomaterials can be derived from donor tissue or from natural or synthetic polymers made to order for their strength or endurance. Because the cardiac cells are human cardiac cells, and not animal cardiac cells, the testing results more accurate reflect the intended results of the cardiac catheter and avoids the ethical concerns associated with animal studies. Features of the present disclosure can be implemented, however, using animal stem cells.

Features of a tool (e.g., cardiac catheter 310) can be repeatedly tested in 3D. For example, 3D models can be generated from the testing and used to identify and characterize features and operational properties of the medical tool. For example, the 3D models can be used to identify and characterize ablation properties of a cardiac catheter (e.g., whether an ablation by the cardiac catheter heats the blood or an organ in close proximity). Catheters may be used to form various characteristics on the live cardiac cells (e.g., scar tissue) to simulate a malfunction of a heart's electrical system and provide a "chronic model" which produces reproducible testing, using the model, relative to a predetermined tissue characteristic. Different focal activities, rotors or arrhythmia models (e.g., an atrial fibrillation (AFIB) model) can be generated by stimulating (e.g. with pacing at different sites) or inducing (e.g. with pacing or drugs) the live cardiac tissue. Recording electrodes of a catheter can be tested to determine whether a malfunction of the heart's electrical system is detected.

Properties or characteristics of a propagation wave can be identified and analyzed by images of fluorescence changes (e.g., using cardiac muscle cells with genetically encoded voltage indicators (GEVIs) enabling long-term studies of action potentials) compared to acquired biometric data acquired via Carto® system signals (LATs, voltage maps and coherent maps) and algorithms. Additionally or alternatively, characteristics of catheter features, such as electrodes resolution, accuracy (e.g., mapping accuracy, pacing accuracy and left cardiac ventricle (LCV) vectors) can be identified and analyzed for accuracy and clinical value.

After the 3D models are generated from the testing, other tools, such as an ultrasound catheter or any other tool used to interact with cardiac tissue during a medical procedure) can be tested using (e.g., viewing) the generated and known 3D models. For example, fluoroscopy can be used to visually analyze the activation of the cardiac cells 304, so that a condition of heart (e.g., the sinus rhythm wave or an arrhythmia) can be viewed by the image acquiring device 316 (shown in FIG. 3) to confirm measurements.

The live cardiac tissue, in contact with a cardiac catheter, generates a sinus rhythm wave in response to an electrical pacing pulse delivered by pacing electrodes. Visually perceptible attributes of the sinus rhythm wave are provided (e.g., displayed to a physician) for determining whether or not one or more features of the catheter are producing accurate and consistent measurements (e.g., within a threshold measurement range).

A physician can also view the cells instead of viewing the portion of anatomy (e.g., heart) based upon a mapping. Stem cells with biological capabilities such as tissue contraction, electrical conduction, response to stimulus and the creation of endogenous electrical impulses allow repeatable and reproducible tests via catheter evaluation. Arrhythmias can be created within such stem cells to test how the catheters react to arrhythmias. In addition, a physician can analyze the sinus rhythm of the cardiac cells by placing the catheter in a Petri dish for pacing.

In an embodiment, the cardiac cells may be used for tissue proximity indication (TPI) testing on a catheter which includes the detection of a catheter's proximity to tissue, using an impedance-based algorithm.

Embodiments also include an image acquiring device (e.g., camera) used to analyze the activation of the cardiac cells, such that a condition of the live cardiac tissue (e.g., sinus rhythm wave or arrhythmia) can be viewed in displayed images acquired by the camera to provide confirmation of correct measurements.

Features of the present disclosure can be implemented with various types of catheters, including catheters used to detect and map electrical activity in human anatomy, ablate portions of human anatomy and obtain biometric data. Features of the present disclosure can be implemented with catheters of various shapes and sizes, including point catheters, basket catheters, catheters inserted through a sheath in a collapsed state and expanded within an organ (e.g., a heart), catheters with any number of electrodes, including any number of ablation electrodes. Examples of such catheters for use with features of the present disclosure include the PICASSO™ catheter and the PENTARAY® catheter, both produced by Biosense Webster, Inc., of Diamond Bar, California.

The test apparatus facilitates the determination of expected inputs and outputs of the catheter, relative to a fixed test that can be duplicated as needed with ease and efficiency. Additionally, the test apparatus enables manufacturers to market a new catheter without extensive development after the pre-clinical stage.

FIG. 1 is an illustration of an example medical system 20 in which a medical tool 22, which is tested according to embodiments disclosed herein, is navigated in a 3-D space. The medical system 20 may be used to generate and display information 52 (e.g., anatomical models of a portion of a patient and signal information). Medical tools, such as tool 22 to be tested according to embodiments disclosed herein, can be any tool used for diagnostic or therapeutic treatment, such as for example, a catheter (such as catheter 202 shown in FIG. 2 and described in more detail below) configured to ablate portions of patient anatomy as well as mapping electrical potentials in a heart 26 of a patient 28. Alternatively, tools may be used, mutatis mutandis, for other therapeutic and/or diagnostic purposes of different portions of anatomy, such as in the heart, lungs or other body organs, such as the ear, nose, and throat (ENT). Tools may include, for example, probes, catheters, cutting tools and suction devices.

An operator 30 may insert the tool 22 into a portion of patient anatomy, such as the vascular system of the patient 28 so that a tip 56 of the tool 22 enters a chamber of the heart 26. The operator 30 may also advance the tool so that the tip 56 engages endocardial tissue at one or more locations. The control console 24 may include an RF generator, such as RF generator 218 shown in FIG. 2, which supplies high-frequency electrical energy via the tool 22 for ablating tissue at locations engaged by the tip 56.

The control console 24 may also use magnetic position sensing to determine three-dimensional (3-D) position coordinates of the tool (e.g., coordinates of the tip 56) inside the heart 26. To determine the position coordinates, a driver circuit 34 in the control console 24 may drive, via connector, 44, field generators 36 to generate magnetic fields within the anatomy of the patient 28.

The field generators 36 include one or more emitter coils (not shown in FIG. 1), placed at known positions external to the patient 28, which are configured to generate magnetic fields in a predefined working volume that contains a portion of interest of the patient anatomy. Each of the emitting coils may be driven by a different frequency to emit a constant magnetic field. For example, in the example medical system 20 shown in FIG. 1, one or more emitter coils can be placed below the torso of the patient 28 and each configured to generate magnetic fields in a predefined working volume that contains the heart 26 of the patient.

As shown in FIG. 1, a magnetic field location sensor 38 is disposed at the tip 56 of tool 22. The magnetic field location sensor 38 generates electrical signals, based on the amplitude and phase of the magnetic fields, indicating the 3-D position coordinates of the tool (e.g., position coordinates of the tip 56). The electrical signals may be communicated to the control console 24 to determine the position coordinates of the tool. The electrical signals may be communicated to the control console 24 via wire 45.

Alternatively, or in addition to wired communication, the electrical signals may be wirelessly communicated to the control console 24, for example, via a wireless communication interface (not shown) at the tool 22 that may communicate with input/output (I/O) interface 42 in the control console 24. For example, U.S. Pat. No. 6,266,551, whose disclosure is incorporated herein by reference, describes, inter alia, a wireless catheter, which is not physically connected to signal processing and/or computing apparatus and is incorporated herein by reference. Rather, a transmitter/receiver is attached to the proximal end of the catheter. The transmitter/receiver communicates with a signal processing and/or computer apparatus using wireless communication methods, such as IR, RF, Bluetooth, or acoustic transmissions. The wireless digital interface and the I/O interface 42 may operate in accordance with any suitable wireless communication standard that is known in the art, such as for example, IR, RF, Bluetooth, one of the IEEE 802.11 family of standards (e.g., Wi-Fi), or the HiperLAN standard.

Although FIG. 1 shows a single magnetic field location sensor 38 disposed at the tip 56 of tool 22, tools may include one or more magnetic field location sensors each disposed at any tool portion. The magnetic field location sensor 38 may include one or more miniature coils (not shown). For example, a magnetic field location sensor may include multiple miniature coils oriented along different axes. Alternatively, the magnetic field location sensor may comprise either another type of magnetic sensor or position transducers of other types, such as impedance-based or ultrasonic location sensors.

The signal processor 40 is configured to process the signals to determine the position coordinates of the tool 22, including both location and orientation coordinates. The method of position sensing described hereinabove is implemented in the CARTO mapping system produced by Biosense Webster Inc., of Diamond Bar, California, and is described in detail in the patents and the patent applications cited herein.

The tool 22 may also include a force sensor 54 disposed at the tip 56 of tool 22. The force sensor 54 may measure a force applied by the tool 22 (e.g., the tip 56 of the tool 22) to the endocardial tissue of the heart 26 and generate a signal that is sent to the control console 24. The force sensor 54 may include a magnetic field transmitter and a receiver connected by a spring (not shown), and may generate an indication of the force based on measuring a deflection of the spring. Further details of this sort of probe and force sensor are described in U.S. Pat. Nos. 8,357,152 and 8,535,308, whose disclosures are incorporated herein by reference. Alternatively, the tool 22 may include another type of force sensor that may use, for example, fiber optics or impedance measurements.

The tool 22 may also include an electrode 48 coupled to the tip 56 and configured to function as an impedance-based position transducer. Additionally or alternatively, the electrode 48 may be configured to measure a certain physiological property, for example the local surface electrical potential (e.g., of cardiac tissue) at one or more locations. The electrode 48 may be configured to apply RF energy to ablate endocardial tissue in an organ, such as the heart 26 shown in FIG. 1.

Although the example medical system 20 may be configured to measure the position of the tool 22 using magnetic-based sensors, other position tracking techniques may be used (e.g., impedance-based sensors). Magnetic position tracking techniques are described, for example, in U.S. Pat. Nos. 5,391,199, 5,443,489, 6,788,967, 6,690,963, 5,558, 091, 6,172,499 6,177,792, the disclosures of which are incorporated herein by reference. Impedance-based position tracking techniques are described, for example, in U.S. Pat. Nos. 5,983,126, 6,456,828 and 5,944,022, the disclosures of which are incorporated herein by reference.

The I/O interface 42 may enable the control console 24 to interact with the tool 22, the body surface electrodes 46 and any other sensors (not shown). Based on acquired location signals (e.g., the electrical impulses received from the body surface electrodes 46 and the electrical signals received from the tool 22 via the I/O interface 42 and other components of medical system 20), the signal processor 40 may determine the location of the tool in a 3-D space and generate the display information 52, which may be shown on a display 50.

The signal processor 40 may be included in a general-purpose computer, with a suitable front end and interface circuits for receiving signals from the tool 22 and controlling the other components of the control console 24. The signal processor 40 may be programmed, using software, to perform the functions that are described herein. The software may be downloaded to the control console 24 in electronic form, over a network, for example, or it may be provided on non-transitory tangible media, such as optical, magnetic or electronic memory media. Alternatively, some or all of the functions of the signal processor 40 may be performed by dedicated or programmable digital hardware components.

In the example shown at FIG. 1, the control console 24 is connected, via cable 44, to body surface electrodes 46, each of which are attached to patient 28 using patches (e.g., indicated in FIG. 1 as circles around the electrodes 46) that adhere to the skin of the patient. Body surface electrodes 46 may include one or more wireless sensor nodes integrated on a flexible substrate. The one or more wireless sensor nodes may include a wireless transmit/receive unit enabling local digital signal processing, a radio link, and a miniaturized rechargeable battery.

In addition or alternative to the patches, body surface electrodes 46 may also be positioned on the patient using articles worn by patient 28 which include the body surface electrodes 46 and may also include one or more position sensors (not shown) indicating the location of the worn article. For example, body surface electrodes 46 can be embedded in a vest that is configured to be worn by the patient 28. During operation, the body surface electrodes 46 may assist in providing a location of the tool (e.g., catheter) in 3-D space by detecting electrical impulses (e.g., generated by the polarization and depolarization of cardiac tissue and transmitting information to the control console 24, via the cable 44). The body surface electrodes 46 can be equipped with magnetic location tracking and can help identify and track the respiration cycle of the patient 28. In addition to or alternative to wired communication, the body surface electrodes 46 may communicate with the control console 24 and one another via a wireless interface (not shown).

During the diagnostic treatment, the signal processor 40 may present the display information 52 and may store data representing the information 52 in a memory 58. The memory 58 may include any suitable volatile and/or non-volatile memory, such as random access memory or a hard disk drive. The operator 30 may be able to manipulate the display information 52 using one or more input devices 59. Alternatively, the medical system 20 may include a second operator that manipulates the control console 24 while the operator 30 manipulates the tool 22. It should be noted that the configuration shown in FIG. 1 is an example. Any suitable configuration of the medical system 20 may be used and implemented.

Figure 2:
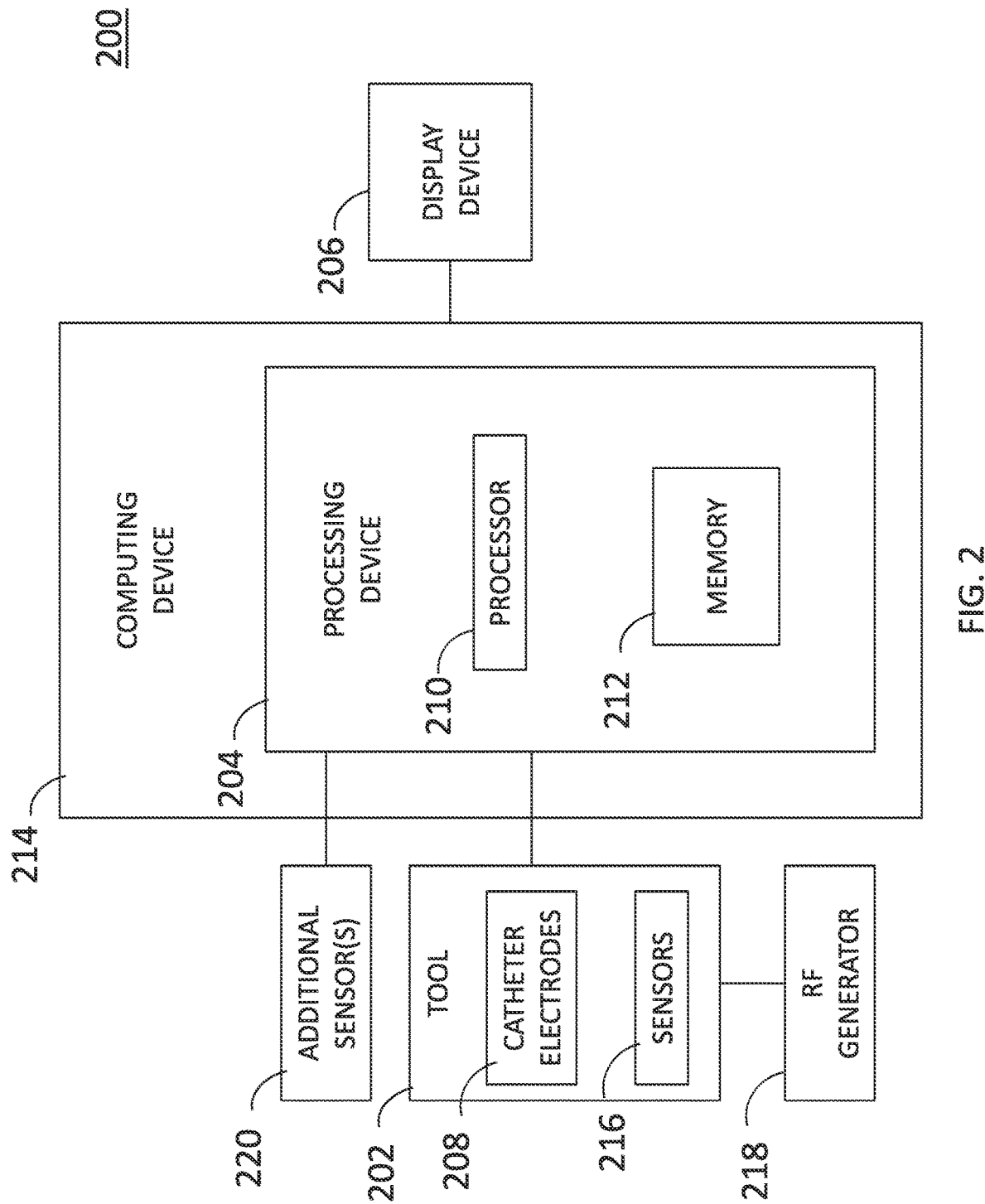
FIG. 2 is a block diagram of components of an example medical system for testing a catheter according to embodiments disclosed herein.

FIG. 2 is a block diagram illustrating example components of a medical system 200 for use with embodiments described herein. As shown in FIG. 2, the system 200 includes a medical tool (e.g., a catheter) 202, a processing device 204, a display device 206, memory 212 and RF generator 218, which supplies high-frequency electrical energy, via catheter 202, for ablating tissue at locations engaged by the catheter 202. As shown in FIG. 2, the processing device 204, display device 206 and memory 212 are a part of computing device 214. The computing device 214 may be part of a surgical system configured to obtain anatomical and electrical measurements of a patient's heart, such as the Carto® system by Biosense Webster.

In some embodiments, the display device 206 may be separate from computing device 214. Computing device 214 may also include an I/O interface, such as I/O interface 42 shown in FIG. 1.

The medical tool 202 shown in FIG. 2 is an example of a medical probe, such as a catheter, which is inserted within patient anatomy for use during a medical procedure. For simplification purposes, the medical tool 202 shown in FIG. 2 is referred to herein as a catheter.

In various embodiments, the catheter electrodes 208 include one or more ablation electrodes configured to ablate tissue areas (e.g., of a cardiac chamber of the heart). The ablation electrodes are configured to provide energy to tissue areas of an organ such as heart. The energy is, for example, thermal energy, which causes damage to the tissue area starting from the surface of the tissue area and extending into the thickness of the tissue area.

Multiple elements of the catheter 202 can also be connected via splines that form the shape of the catheter. The catheter 202 may also include one or more additional elements (not shown), such as electrodes or transducers configured to ablate a portion of patient anatomy or to obtain biometric data.

Biometric data obtained by the catheter 202 may include one or more of local activation times (LATs), electrical activity, topology, bipolar mapping, dominant frequency, impedance, or the like. The LAT may be a point in time of a threshold activity corresponding to a local activation, calculated based on a normalized initial starting point. Electrical activity may be any applicable electrical signals that may be measured based on one or more thresholds and may be sensed and/or augmented based on signal to noise ratios and/or other filters.

A topology may correspond to the physical structure of a body part or a portion of a body part and may correspond to changes in the physical structure relative to different parts of the body part or relative to different body parts. A dominant frequency may be a frequency or a range of frequency that is prevalent at a portion of a body part and may be different in different portions of the same body part. For example, the dominant frequency of a pulmonary vein of a heart may be different than the dominant frequency of the right atrium of the same heart. Impedance may be the resistance measurement at a given area of a body part.

As shown in FIG. 2, the example catheter 202 includes one or more sensors 216, such as for example, a magnetic field location sensor (e.g., sensor 38 in FIG. 1) for providing location signals to indicate the 3-D position coordinates of the catheter 202. In some procedures, one or more additional sensors 220 that are separate from the catheter 202, as shown in example system 200, are also used to provide location signals. In some embodiments, the catheter 202 also includes catheter electrodes 208 for mapping electrical potentials of a heart.

Sensors 216 also include, for example, position sensors, pressure or force sensors, temperature sensors, impedance sensors or other sensors which provide ablation parameter signals indicating ablation parameters during the ablation of tissue of an organ. During the ablation procedure, RF generator 218 supplies high-frequency electrical energy, via catheter 202, for ablating tissue at locations engaged by the catheter 202. Sensors 216 sense ablation parameters (e.g., catheter position stability, temperature, ablation time, ablation power and ablation impedance) during the ablation procedure. Catheter 202 may be in wired or wireless communication with processing device 204 to communicate the information acquired by sensors 216.

The processing device 204, includes processor 210 and memory 212. Memory 212 includes, for example, volatile and non-volatile memory, such as random access memory (RAM), dynamic RAM, or a cache. Memory 212 also includes, for example, storage 214, such as, fixed storage (e.g., a hard disk drive and a solid state drive) and removable storage (e.g., an optical disk and a flash drive).

Processor 210 is configured to receive location signals as location data and store the location data, for example, in memory 212. Processor 210 is configured to generate mapping information, from the location data, for displaying one or more maps of an organ being ablated. The processor 210 also receives ablation parameter signals which are processed as ablation parameter data and stored, for example, in memory 212. The processor 210 processes the ablation parameter signals as ablation parameter data and uses the ablation parameter data to determine whether the catheter 202 contacted the organ tissue at the portion of the organ.

Processor 210 drives display device 206 to display a map of an organ, biometric data (e.g., electrical activity), information regarding whether the catheter 202 contacted the organ tissue at the portion of the organ and information indicating an in-blood ablation (as opposed to an ablation of the organ tissue).

Display device 206 may be in wired or wireless communication with processing device 204. In some embodiments, display device may be separate from computing device 214. For example, display device 206 can be connected locally to the computing device 214 or alternatively, can be at a remote location, such as a separate hospital or in separate healthcare provider networks. Additionally, the system may be part of a surgical system that is configured to obtain anatomical and electrical measurements of a patient's organ, such as a heart, and performing a cardiac ablation procedure, such as the Carto® system by Biosense Webster Inc., of Diamond Bar, California Display device 206 may include one or more displays each configured to display one or more maps of the organ. For example, display device 206 is configured to display maps representing a spatio-temporal manifestation of an organ (e.g., a heart) as well as geometrical objects which represent estimated ablation depths and widths.

Figure 3:
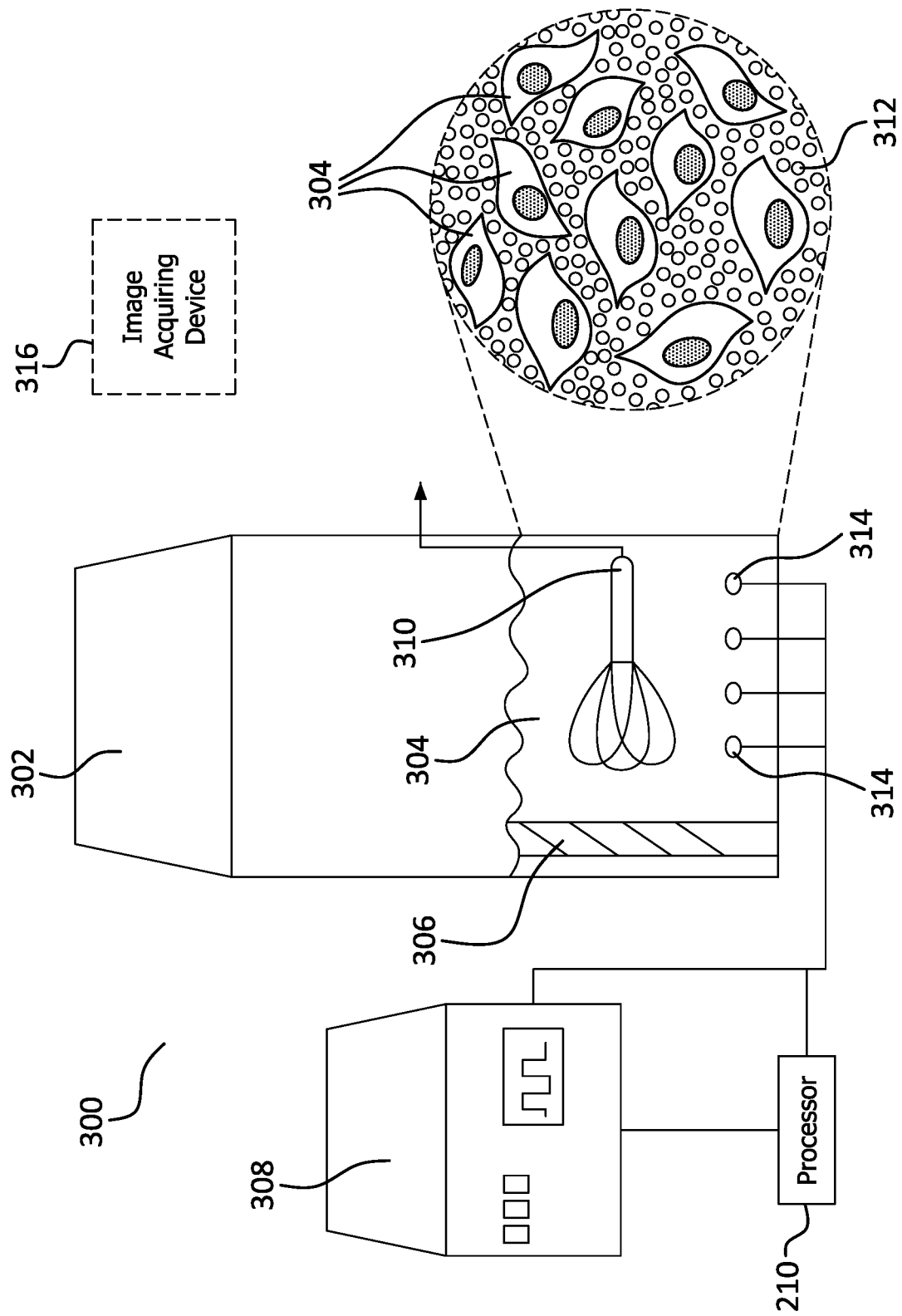
FIG. 3 is an illustration of an example apparatus for testing a cardiac catheter according to embodiments disclosed herein.

FIG. 3 is an illustration of an example test apparatus 300 for testing a cardiac catheter according to embodiments disclosed herein. As shown in FIG. 3, the test apparatus 300 includes a vessel 302 and an electric pulse generator 308. The vessel 302 includes live cardiac tissue (i.e., cardiac cells 304). The live cardiac tissue is grown using the scaffold 312, formed from biomaterial, in which the cells 304 proliferate on the scaffold. The vessel 302 also includes cardiac catheter 310. The test apparatus 300 utilizes the cardiac cells 304 that have been cultured in vitro and proliferated on the 3-D cell-seeded scaffold 312, as shown in inset. That is, the scaffold 312 shown in FIG. 3 is an example of a scaffold which has been seeded with human cardiac cells 304 that have proliferated on the scaffold 312 to create cardiac tissue. The cardiac cells 304 may be preserved in a live state using known chemical compositions.

As the cardiac cells 304 continue to proliferate on the scaffold 312, they become extensively branched and connected to one another at their ends by intercalated discs, which allows the cardiac cells to contract in a wave-like pattern similar to cardiac cells in a human heart. The cell-seeded scaffold 312 may be cultured in vitro to synthesize the cardiac tissue.

The scaffold 312 may be formed of a plurality of two-dimensional (2-D) graphene sheets. The scaffold 312 is formed from biocompatible material such that the cardiac cells adhere to and migrate through the scaffold 312 and onto the surface of the scaffold 312 and proliferate and function normally. The scaffold 312 includes, for example, an interconnected pore structure and high porosity to ensure cellular penetration and adequate diffusion of nutrients to the cardiac cells within the scaffold 312.

Features of the disclosure can be implemented using a 2-D or 3-D scaffold to provide an appropriate environment for the generation of cardiac tissue. A 3-D scaffold may be formed of a plurality of 2-D scaffold elements, which are linked together by cross-linking polymers to form the 3-D scaffold. The scaffold essentially acts as a template for tissue formation and is typically seeded with cells, and occasionally growth factors, or is subjected to different types of mechanical or chemical stimuli.

The electrical pulse generator 308 is configured to deliver electrical pacing to the human cardiac cells 304 via a plurality of pacing electrodes 314 extending from the electrical pulse generator 308 and submerged beneath the cardiac cells 26 in vessel 302. The pacing electrodes 314 are used to pulse the cardiac cells 304 at different rates and to create different wave patterns in the cardiac cells 304.

In the example shown in FIG. 3, four pacing electrodes 314 are shown spaced at approximately equidistant intervals along the length of the vessel 302. The location of the pacing electrodes 314, the number of pacing electrodes 314 and the spacing of the pacing electrodes 314 shown in FIG. 3 is merely an example. Features of the present disclosure may be implemented by using any number of pacing electrodes which are disposed at locations different than the locations shown in FIG. 3 to pulse cardiac cells at different rates and to create different wave patterns in the cardiac cells. In addition, features of the present disclosure may be implemented by pacing electrodes 314 disposed on the cardiac catheter 310.

As a result of the cardiac cells 304 being extensively branched and interconnected, the cardiac cells 304 contract in a wave-like pattern and exhibit a sinus rhythm wave 306 in response to the delivery of electrical pacing through the pacing electrodes 314. The pacing electrodes 314 are, for example, configured (e.g., arranged) to create a normal sinus rhythm 306 within the cardiac cells 306. Alternatively, the pacing electrodes 314 are configured deliver electrical pacing pulses in predetermined sequences to create different sinus rhythms 306 within the cardiac cells 304 that are normal and abnormal.

The processor 210 is in communication (wired or wireless communication) with the electrical pulse generator 308 and the pacing electrodes 314 and is configured to control the electrical pulse generator 308 and the pacing electrodes 314 for delivering the electrical pacing pulses. The processor 210 may also be in wired or wireless communication with the catheter 310 (e.g., with recording electrodes 402 shown in FIG. 4).

The processor 210 may also be in wired or wireless communication with a display device 206. For example, the attributes of the sinus rhythm wave are provided, by processor 210, as attribute information for display on display device 206. Accordingly. a medical professional (e.g., a physician) can view the visually perceptible attribute information in the vessel 302 and compare the visually perceptible attribute information in the vessel 302 with the displayed attribute information of the sinus rhythm wave 306 to determine the accuracy of the recording electrodes 402 of the cardiac catheter 310.

In one embodiment, an image acquisition device 316 (e.g., a camera), shown in phantom, can be used to acquire images of the live cardiac cells 304. For example if scars are produced on the live cardiac cells 304, the acquired images of the scars can be compared to a displayed map, (e.g., a voltage map generated by the surgical system, such as the Carto® system by Biosense Webster).

Figure 4:
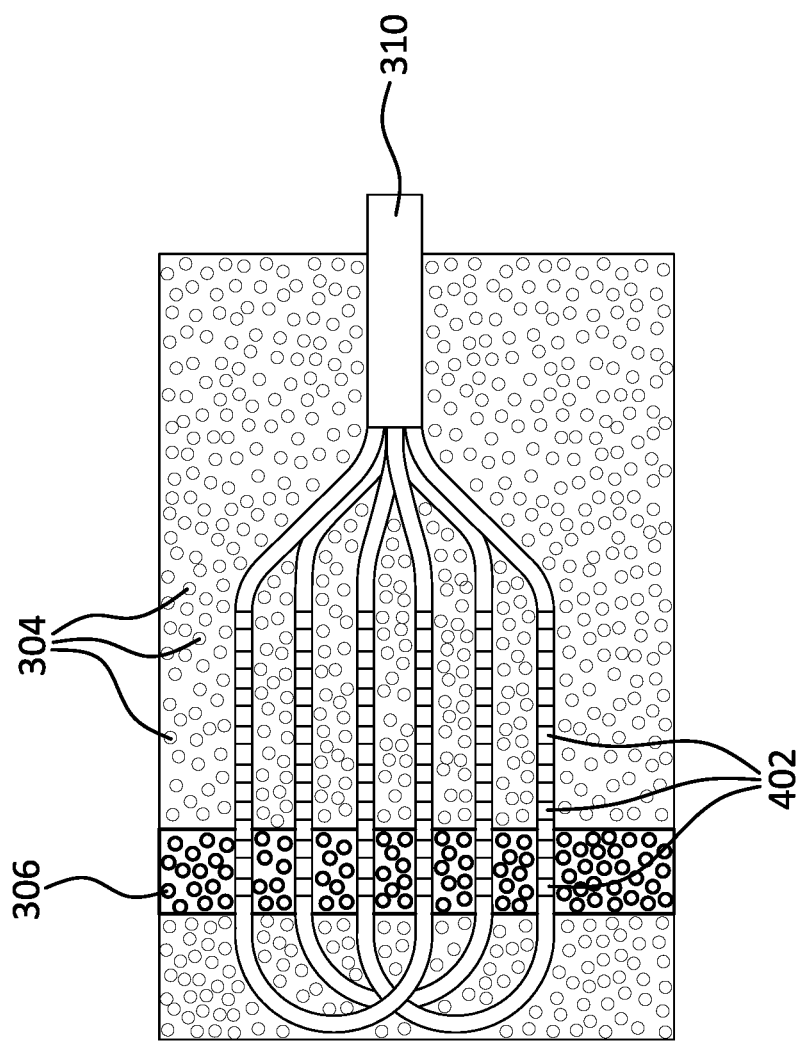
FIG. 4 is an illustration of an example cardiac catheter in contact with cardiac cells and a sinus rhythm wave displayed according to embodiments disclosed herein.

FIG. 4 is an illustration of an example cardiac catheter 310, in contact with cardiac cells 304, and a sinus rhythm wave 306 during testing according to embodiments disclosed herein. For example, the illustration shown in FIG. 4 is a view seen by a medical professional during testing. Alternatively, the information shown in FIG. 4 can be part of an image acquired by the image acquiring device 316 shown in FIG. 3.

A visually perceptible sinus rhythm wave 306, shown as a dark vertical band which indicates the wave-like pattern, is exhibited by the cardiac cells 304 in response to electrical pulsing provided through the pacing electrodes 314. The sinus rhythm wave is, for example, a P-wave representing the electrical depolarization of the atria of the heart. The sinus rhythm wave 306 may be increased or decreased in frequency based upon electrical pulsing provided by the electrical pulse generator 308 through the pacing electrodes 314. The sinus rhythm wave 306 may be adjusted to move from left to right, or from right to left, or may be adjusted to exhibit an abnormal rhythm.

As shown in FIG. 4, the example cardiac catheter 310 includes a plurality of recording electrodes 402 configured to detect attributes of the sinus wave 306. For example, during testing, the cardiac catheter 310 is brought into proximity with or submerged within the human cardiac cells 304, and the recording electrodes 402 receive and record various attributes of the sinus wave 306 exhibited by the cardiac cells 304 within the vessel 302. These attributes can be displayed on a display device (e.g., display device 206). The attributes of the sinus wave 306 shown on the display 54 can be compared with the visually-perceptible sinus wave 306 generated by the electrical pulse generator 308 to determine whether the recording electrodes 402 are accurately detecting various attributes of the sinus wave 306.

The cardiac catheter 310 shown in FIG. 4 is merely an example. Features of the present disclosure can be implemented with various types of catheters, including catheters used to detect and map electrical activity in human anatomy, ablate portions of human anatomy and obtain biometric data. Features of the present disclosure can be implemented with catheters of various shapes and sizes, including point catheters, basket catheters, catheters inserted through a sheath in a collapsed state and expanded within an organ (e.g., a heart), catheters with any number of electrodes, including any number of ablation electrodes.

Patient anatomy is formed by growing the cardiac cells using the heart scaffold 312 and test (e.g., repeatedly) features of a tool (e.g., cardiac catheter 310) in 3D. For example, 3D models can be generated from the testing and used to identify and characterize features and operational properties of the cardiac catheter. For example, the 3D models can be used to identify and characterize ablation properties (e.g., whether an ablation by the cardiac catheter heats the blood or an organ in close proximity. Alternatively, an ablation electrode of a cardiac catheter may be used to ablate or kill one or more of the live cardiac cells 304 within the vessel 302 to form scar tissue and simulate a malfunction of the heart's electrical system. A scar in the live cardiac tissue can also be formed using another medical tool such as a scalpel. The recording electrodes 402 can be tested to determine whether a malfunction of the heart's electrical system (e.g., malfunction resulting from scar tissue) is being properly detected by the recording electrodes 402 of the catheter 310.

Other approaches can also be used for simulating a malfunction of the heart's electrical system within the cardiac cells 304 of the test apparatus 300. Different focal activities, rotors or arrhythmia models (e.g., an atrial fibrillation (AFIB) model) can be generated by stimulating (e.g. with pacing at different sites) or inducing (e.g. with pacing or drugs) the live cardiac tissue. Fluoroscopy can be used to visually analyze the activation of the cardiac cells 304, so that a condition of heart (e.g., the sinus rhythm wave or an arrhythmia) can be viewed by the image acquiring device 316 (shown in FIG. 3) to confirm measurements. Properties or characteristics of a propagation wave can be identified and analyzed by images of fluorescence changes (e.g., using cardiac muscle cells with genetically encoded voltage indicators (GEVIs) enabling long-term studies of action potentials) compared to acquired biometric data acquired via Carto® system signals (LATs, voltage maps and coherent maps) and algorithms. Additionally or alternatively, Characteristics of catheter features, such as electrodes resolution, accuracy (e.g., mapping accuracy, pacing accuracy and left cardiac ventricle (LCV) vectors) can be identified and analyzed for accuracy and clinical value.

After the 3D models are generated from the testing, other tools, such as an ultrasound catheter or any other tool used to interact with cardiac tissue during a medical procedure) can be tested using (e.g., viewing) the generated and known 3D models. For example, fluoroscopy can be used to visually analyze the activation of the cardiac cells 304, so that a condition of heart (e.g., the sinus rhythm wave or an arrhythmia) can be viewed by the image acquiring device 316 (shown in FIG. 3) to confirm measurements.

Figure 5:
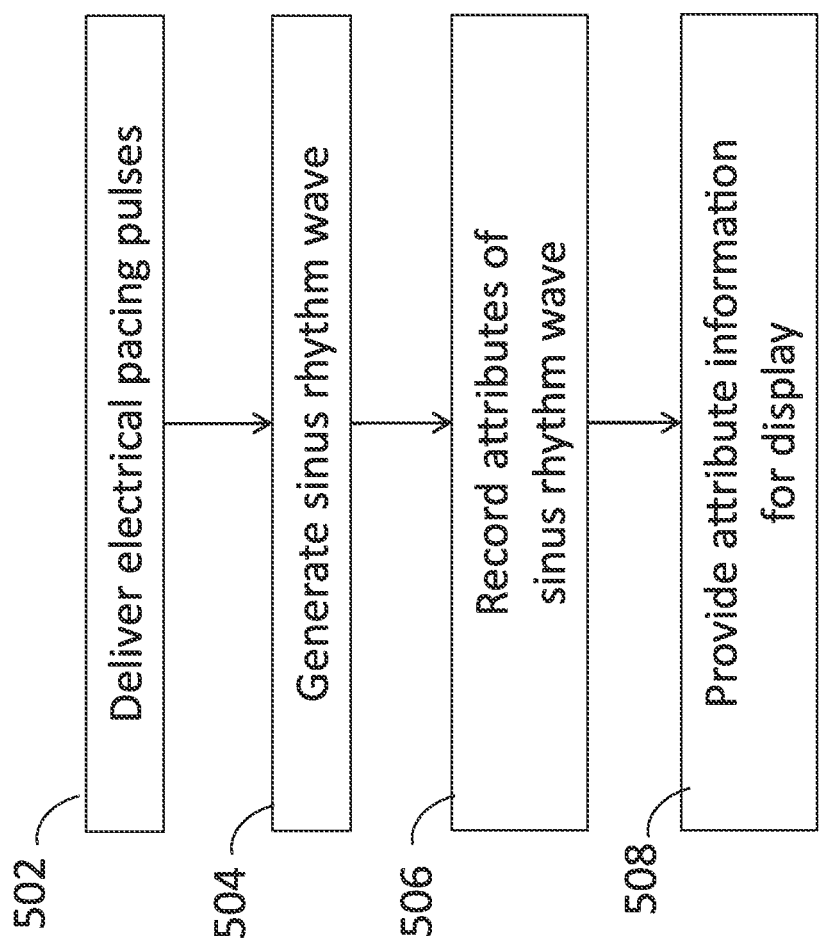
FIG. 5 is a flow diagram illustrating an example method of testing a medical tool according to embodiments disclosed herein.

FIG. 5 is a flow diagram illustrating an example method 500 of testing a cardiac catheter under conditions replicating a beating heart according to embodiments disclosed herein. In the example shown in FIG. 5, electrical pacing pulses are provided to the live cardiac cells 304 in the vessel 302. Features of the present disclosure can also be implemented by the live cardiac tissue automatically contract without external pacing. In addition, in the example shown in FIG. 5, a visually perceptible condition of the cardiac tissue is described as sinus rhythm wave. Features of the present disclosure can also be implemented, however, for other conditions, such as atrial fibrillation or another arrhythmia).

As shown at block 502, the method 500 includes delivering electrical pacing pulses to the live cardiac tissue. For example, electrical pulses are generated by the electrical pulse generator 308. The plurality of pacing electrodes 314 delivers the electrical pulses as electrical pacing pulses to the live cardiac cells 304 in the vessel 302.

As shown at block 504, the method 500 includes generating a sinus rhythm wave. For example, a sinus rhythm wave 306 is generated by the live cardiac cells 304 in response to the electrical pacing pulses delivered by the plurality of pacing electrodes 314.

As shown at block 506, the method 500 includes recording attributes of the sinus rhythm wave. For example, attributes of the sinus rhythm wave 306 are recorded by recording electrodes 402 disposed on a cardiac catheter 310 in contact with the live cardiac cells 304.

As shown at block 508, the method 500 includes providing attribute information for display. For example, the attributes of the sinus rhythm wave are provided, by processor 210, as attribute information for display on display device 206. Accordingly. a medical professional (e.g., a physician) can view the visually perceptible attribute information in the vessel 302 and compare the visually perceptible attribute information in the vessel 302 with the displayed attribute information of the sinus rhythm wave to determine the accuracy of the recording electrodes 402 of the cardiac catheter 310.

What is claimed is:

1. A cardiac catheter testing apparatus comprising:
    a vessel housing:
        in vitro live cardiac tissue comprising cardiac cells proliferating on a scaffold in the vessel, the scaffold comprising a biomaterial,
        a cardiac catheter in the vessel and having one or more recording electrodes in contact with the live cardiac tissue, the cardiac catheter being removable from the vessel, and
        one or more pacing electrodes within the vessel and in electrical communication with the live cardiac tissue; and
    an electrical pulse generator outside of the vessel and electrically connected to the one or more pacing electrodes, the electrical pulse generator configured to deliver electrical pulses via the one or more pacing electrodes to the live cardiac tissue to thereby create one or more known wave patterns in the live cardiac tissue, and
    a processor configured to:
        process pacing electrode signals from the pacing electrodes indicative of the one or more known wave patterns in the live cardiac tissue,
        process recording electrode signals from the one or more recording electrodes of the cardiac catheter, the recording electrode signals indicative of one or more detected wave patterns detected by the one or more recording electrodes of the cardiac catheter, and
        generate a visual perception of the one or more known wave patterns and the one or more detected wave patterns in the live cardiac tissue to enable comparison of the one or more detected wave patterns and the one or more known wave patterns to determine accuracy of the one or more detected wave patterns.

2. The apparatus of claim 1, further comprising a display device, the visual perception of the one or more known wave patterns and the one or more detected wave patterns being displayed on the display device.

3. The apparatus of claim 1, wherein the one or more pacing electrodes is disposed on the cardiac catheter.

4. The apparatus of claim 1, wherein the one or more known wave patterns comprises at least one of a sinus rhythm wave or an arrhythmia.

5. The apparatus of claim 1, wherein the one or more recording electrodes of the cardiac catheter comprises a plurality of recording electrodes configured to record attributes of the one or more detected wave patterns.

6. The apparatus of claim 5, wherein the plurality of recording electrodes are spaced approximately equidistantly along a spline of the cardiac catheter.

7. The apparatus as recited in claim 1, further comprising an additional cardiac catheter configured to provide energy to the live cardiac tissue and cause damage thereto to simulate a malfunction of a heart's electrical system.

8. The apparatus of claim 1, wherein the cardiac cells are human cardiac cells.

9. The apparatus of claim 1, wherein the cardiac cells are animal cardiac cells.

10. A cardiac catheter testing system comprising:
    a vessel housing:
        in vitro live cardiac tissue comprising cardiac cells proliferating on a scaffold in the vessel, the scaffold comprising a biomaterial,
        a cardiac catheter in the vessel and having one or more recording electrodes in contact with the live cardiac tissue, the cardiac catheter being removable from the vessel, and
        one or more pacing electrodes within the vessel and in electrical communication with the live cardiac tissue;
    an electrical pulse generator outside of the vessel and electrically connected to the one or more pacing electrodes, the electrical pulse generator configured to provide electrical pulses to the live cardiac tissue to thereby create one or more known wave patterns in the live cardiac tissue; and
    a processor configured to:
        process pacing electrode signals from the one or more pacing electrodes indicative of the one or more known wave patterns in the live cardiac tissue,
        process recording electrode signals from the one or more recording electrodes of the cardiac catheter, the recording electrode signals indicative of one or more detected wave patterns detected by the one or more recording electrodes of the cardiac catheter, and
        display a visual perception of attributes of the one or more known wave patterns and attributes of the one or more detected wave patterns on a display to enable comparison of the attributes of the one or more detected wave patterns and the attributes of the one or more known wave patterns to determine accuracy of the one or more detected wave patterns.

11. The system of claim 10, wherein the one or more known wave patterns comprises at least one of a sinus rhythm wave or an arrhythmia.

12. The system of claim 10, wherein the one or more recording electrodes of the cardiac catheter comprises a plurality of recording electrodes configured to record the attributes of the one or more detected wave patterns of the live cardiac tissue.

13. The system of claim 10, further comprising an image acquiring device configured to acquire images of the attributes of the one or more known wave patterns or the one or more detected wave patterns of the live cardiac tissue.

14. The system of claim 13, further comprising a fluoroscopy imaging system which includes the image acquiring device.

15. The system of claim 10, wherein the one or more pacing electrodes comprises a plurality of pacing electrodes that are spaced approximately equidistantly from each other and are in contact with the live cardiac tissue within the vessel.

16. A method of testing operational accuracy of a cardiac catheter under conditions replicating a beating heart, the method comprising:
- removably inserting the cardiac catheter into a vessel housing:
  - in vitro live cardiac tissue comprising cardiac cells proliferating on a scaffold in the vessel, the scaffold comprising a biomaterial, and
  - one or more pacing electrodes within the vessel and in electrical communication with the live cardiac tissue, the cardiac catheter being in contact with the live cardiac tissue in the vessel;
- delivering electrical pacing pulses to the live cardiac tissue from an electrical pulse generator outside the vessel, the electrical pulse generator being electrically connected to the one or more pacing electrodes, the electrical pacing pulses creating one or more wave patterns in the live cardiac tissue;
- recording attributes of the one or more wave patterns of the live cardiac tissue using one or more recording electrodes of the cardiac catheter; and
- determining the operational accuracy of the cardiac catheter from the one or more wave patterns recorded by the one or more recording electrodes of the cardiac catheter.

17. The system as recited in claim 10, further comprising an additional cardiac catheter configured to provide energy to the live cardiac tissue and cause damage thereto to simulate a malfunction of a heart's electrical system.

18. The system of claim 10, wherein the cardiac cells are human cardiac cells.

19. The system of claim 10, wherein the cardiac cells are animal cardiac cells.

20. The method of claim 16, further comprising displaying a visual perception of the attributes of the one or more wave patterns of the live cardiac tissue on a display, and wherein the determining the operational accuracy of the cardiac catheter comprises determining the operational accuracy of the cardiac catheter from the visual perception of the attributes of the one or more wave patterns in the live cardiac tissue.

* * * * *